(12) United States Patent
Lu

(10) Patent No.: US 8,800,116 B2
(45) Date of Patent: Aug. 12, 2014

(54) HAND PULLER FOR STORING A BAND

(76) Inventor: Jung-Wen Lu, Taichung (TW)

( * ) Notice: Subject to any disclaimer, the term of this patent is extended or adjusted under 35 U.S.C. 154(b) by 18 days.

(21) Appl. No.: 13/465,148

(22) Filed: May 7, 2012

(65) Prior Publication Data

US 2013/0291353 A1 Nov. 7, 2013

(51) Int. Cl.
*B65H 75/34* (2006.01)
*B25B 25/00* (2006.01)
*B60P 7/06* (2006.01)

(52) U.S. Cl.
USPC .......................................... 24/68 CD; 24/170

(58) Field of Classification Search
CPC ...... B60P 7/083; A44B 11/125; A44B 11/12; A44B 11/14; B65D 63/16; A41F 9/002
USPC .......... 24/68 E, 68 CD, 69 CT, 71 ST, 71 TD, 24/170, 182, 191, 192, 193, 197, 18; 254/217, 223, 365, 391, 411
See application file for complete search history.

(56) References Cited

U.S. PATENT DOCUMENTS

| | | | | | |
|---|---|---|---|---|---|
| 342,110 | A | * | 5/1886 | Kjellstrom | 24/170 |
| 2,513,169 | A | * | 6/1950 | Griswold | 24/170 |
| 2,622,293 | A | * | 12/1952 | Wermlinger | 24/170 |
| 2,981,993 | A | * | 5/1961 | Elsner | 24/170 |
| 2,998,626 | A | * | 9/1961 | Prete, Jr. | 24/170 |
| 3,253,309 | A | * | 5/1966 | Baresch | 24/170 |
| 3,413,691 | A | * | 12/1968 | Elsner | 24/170 |
| 6,195,848 | B1 | * | 3/2001 | Jackson et al. | 24/68 CD |
| 6,877,189 | B2 | * | 4/2005 | Simonson et al. | 24/170 |
| 7,752,722 | B2 | * | 7/2010 | Calkin | 24/632 |
| 7,861,382 | B1 | * | 1/2011 | Madachy et al. | 24/68 CD |
| 8,099,836 | B2 | * | 1/2012 | Breeden et al. | 24/68 CD |
| 8,209,821 | B1 | * | 7/2012 | Chen | 24/68 CD |
| 8,214,975 | B2 | * | 7/2012 | Calkin | 24/632 |
| 2004/0084489 | A1 | * | 5/2004 | Murphey et al. | 224/221 |
| 2004/0094650 | A1 | * | 5/2004 | Huang | 242/385.4 |
| 2010/0275420 | A1 | * | 11/2010 | Huang | 24/68 CD |
| 2012/0110801 | A1 | * | 5/2012 | Joubert et al. | 24/68 CD |

* cited by examiner

*Primary Examiner* — Robert J Sandy
*Assistant Examiner* — Rowland Do
(74) *Attorney, Agent, or Firm* — Rosenberg, Klein & Lee

(57) ABSTRACT

A hand puller for storing a band. The base of a body is provided with a winding axle. A ratchet is driven to rotate the winding axle. A long band goes from the other end of the hook tool through the winding axle and winds around the winding axle. The other end of the winding axle is connected with another hook tool. One end of the belt of a tying structure is fixed with a buckle. The other end of the belt winds around the connecting part and goes through the buckle, getting fixed by the buckle after the length thereof is adjusted.

7 Claims, 9 Drawing Sheets

HAND PULLER FOR STORING A BAND

BACKGROUND OF THE INVENTION

1. Field of Invention

The invention relates to a hand puller and, in particular, to the structure of a hand puller that stores a band.

2. Related Art

FIG. 9 shows the structure of a conventional hand puller. Its body 90 includes a base 91 and a handle 92. The base 91 is provided with a winding axle 93. When binding an object, one lets the band 94 go through the winding axle 93. In accord with the size of the object, the extra band 940 is pulled out. The user then uses the handle 92 to tighten the band 94 so that the object is tightly bundled. The extra band 940 mentioned above is usually collected and tied outside the tightened band 94 or directly put in the cart of a truck (not shown). Aside from a bad appearance, the extra band 940 may become loose and fall out of the car.

PROC Pat. No. 200680001004.5 discloses a cargo safety protection device, which is one embodiment of the hand puller. As shown in its FIG. 1b, the band 4 is winded and stored around a storage axle 6. Although winding the band 4 around the storage axle 6 can prevent it from getting loose, the volume of this structure is too large. One also needs to design an appropriate structure for the band 4 to wind around or be released from the storage axle 6. Therefore, such a device has a higher production cost. The large volume of the winded band 4 is inconvenient for the user to operate.

It is therefore an objective of the invention to solve the aforementioned problems in the conventional hand puller.

SUMMARY OF THE INVENTION

An objective of the invention is to provide a hand puller for storing a band that has simple structure and small volume. In comparison with the conventional hand puller, the invention has the advantages of lower cost and convenience in use.

To achieve the above-mentioned objective, the invention includes:

a body containing at least a base whose one end is provided with a winding axle having a ratchet driven to rotate the winding axle;

a long band whose one end is connected with a first hook and whose other end goes through the winding axle of the body to wind around the winding axle as the winding axle rotates;

a second hook containing a connecting part to connect with the end of the base without the winding axle and a hook part at the end of the connecting part; and at least one band structure having a belt and at least one buckle, with one end of the belt fixed to the buckle and the other end thereof winding around the connecting part and going through the buckle so that the other end is fixed by the buckle after adjusting the length.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
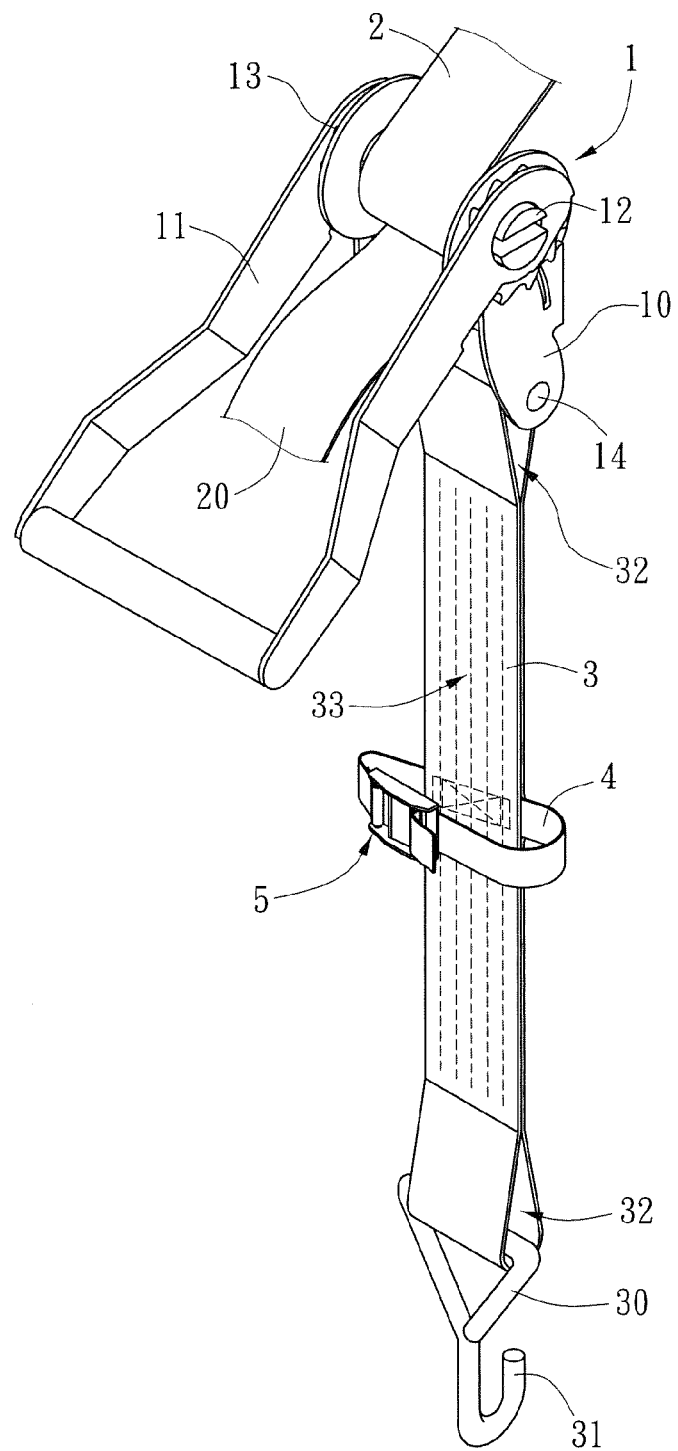
FIG. 1 is a three-dimensional view of the hand puller according to a first embodiment of the invention.

Please refer to FIGS. 1 to 6 for a first embodiment of the invention. In this embodiment, the hand puller for storing a band includes a body 1, a long band 2, a short band 3, and a binding structure composed of a belt 4 and a buckle 5, as shown in FIG. 1.

As shown in FIG. 1, the body 1 includes a base 10 and a handle 11. One end of the base 10 is provided with a winding axle 12. Both ends of the winding axle 12 are connected with a ratchet 13, respectively. The ratchets 13 are driven by the handle 11 to rotate the winding axle 12. An axle bar 14 is provided on the end of the base 10 opposite to the winding axle 12.

As shown in FIG. 1, one end of the long band 2 is connected with a first hook tool (not shown). The other end of the long band 2 goes through the winding axle 12 of the body 1. As the winding axle 12 rotates, the long band 2 is winded around the winding axle 12.

As shown in FIG. 1, the short band (also referred to herein as a connecting band) 3 has a fixed length. One end of the short band 3 is connected to the axle bar 14 of the body 1, and the other end thereof is connected with a hook member, and specifically to a head section 30 thereof. The head section 30 is integrally formed with a hook part 31. The short band 3, the head section 30, and the hook part 31 together form a connecting part. Both ends of the short band 3 have a through hole 32, respectively. The axle bar 14 of the body 1 goes through one of the through holes 32, and the head section 30 goes through the other through hole 32.

As shown in FIG. 1, one end of the belt 4 enters one side edge of the short band 3 and goes out from the opposite side edge of the short band 3, in the direction perpendicular to the short band 3. One end of the belt 4 is fixed to the buckle 5. The other end of the belt 4 goes through the buckle 5, and gets fixed by the buckle 5 after the length thereof is adjusted.

Figure 2:
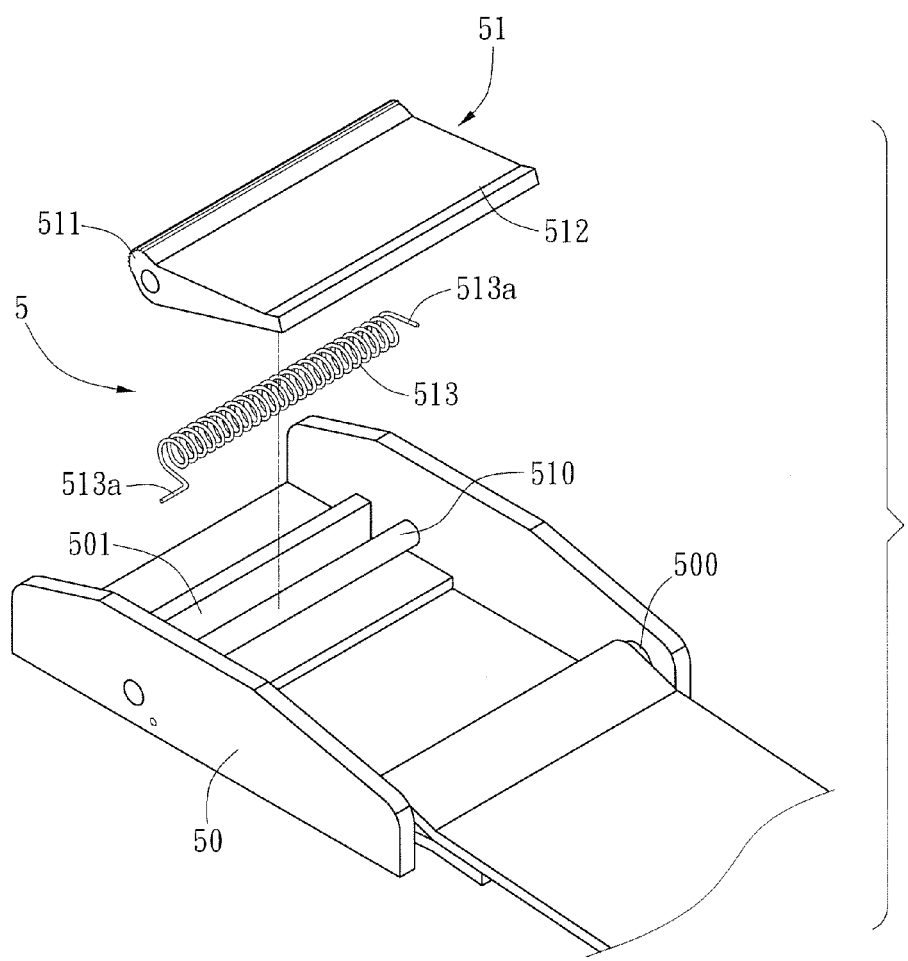
FIG. 2 is a three-dimensional exploded view of the buckle in the first embodiment.
Figure 4:
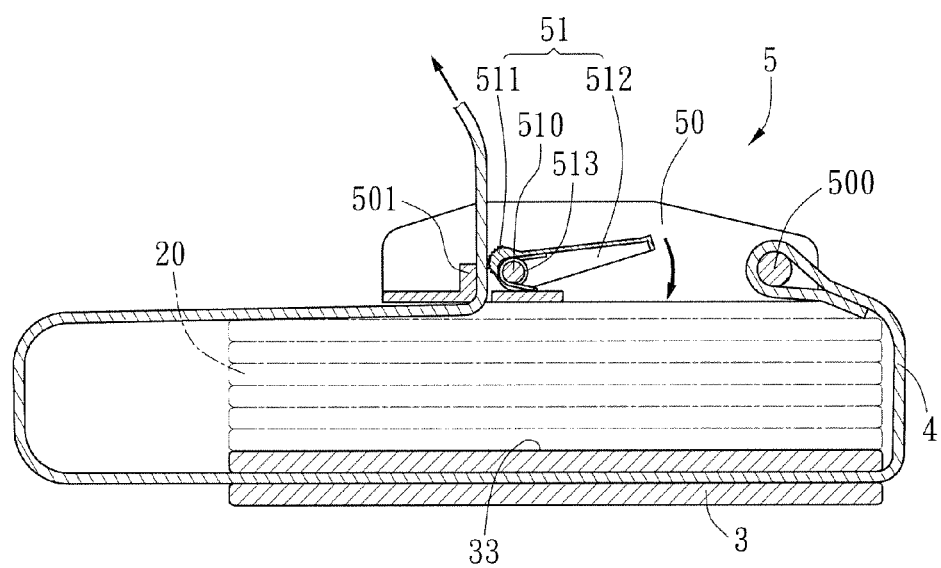
FIG. 4 shows the action of tightening the band with respect to the buckle according to the first embodiment.

As shown in FIGS. 2 and 4, the buckle 5 in this embodiment includes a buckle base 50 and a positioning element 51. The positioning element 51 can pivotally rotate within the buckle base 50. The buckle base 50 is formed with a base bottom portion and a pair of base side walls at the edges of the bottom portion. One end of the buckle base 50 has an axle bar 500. The other end of the buckle base 50 has a stopping part 501 extending vertically above the base bottom portion. The positioning element 51 is pivotally installed between the axle bar 500 and the stopping part 501 of the buckle base 50 using an axle element 510. The positioning element 51 includes a tugging part 511 and a pressing part 512. A torsional spring 513 is mounted on the axle element 510. The torsional spring 513 has two end feet 513a, one of which urges against the bottom base portion of the buckle base 50, and the other urges against the pressing part 512. One end of the belt 4 is connected to the axle bar 500 of the buckle base 50. The belt 4 in this embodiment goes through the center of the short band 3 between the two through holes 32. Moreover, the belt 4 and the short band 3 are secured each to the other with stitches.

Figure 3:
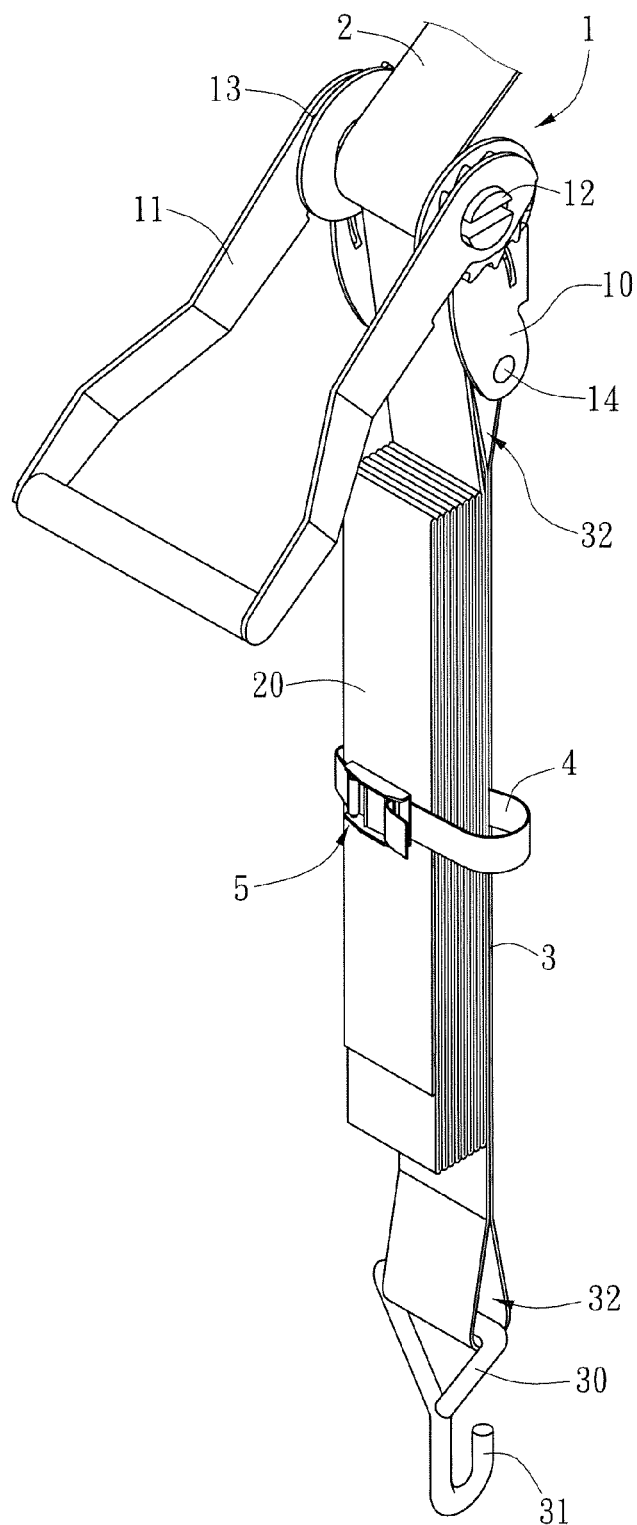
FIG. 3 is a schematic view of collecting the extra band according to the first embodiment.
Figure 5:
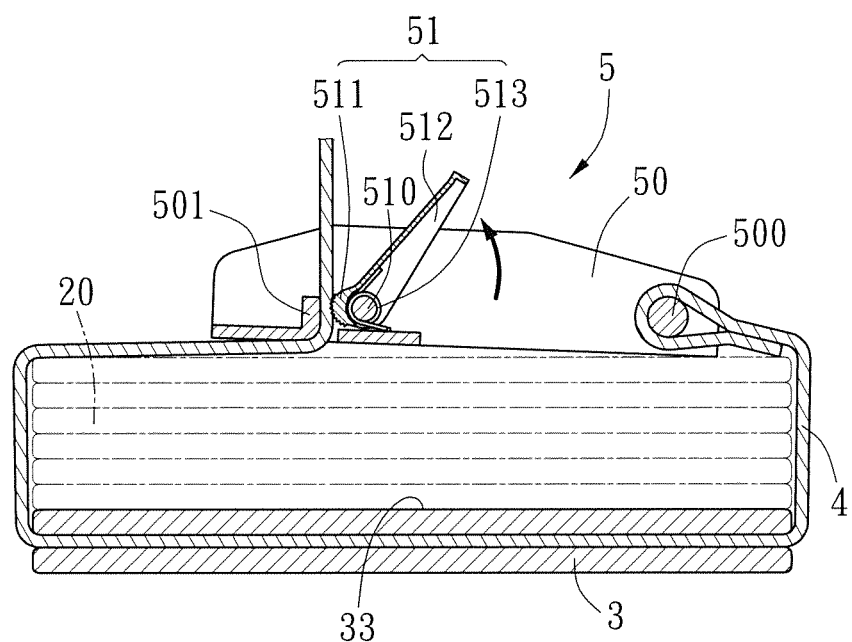
FIG. 5 is a schematic view showing that the band is positioned by the buckle after it is tightened according to the first embodiment.
Figure 6:
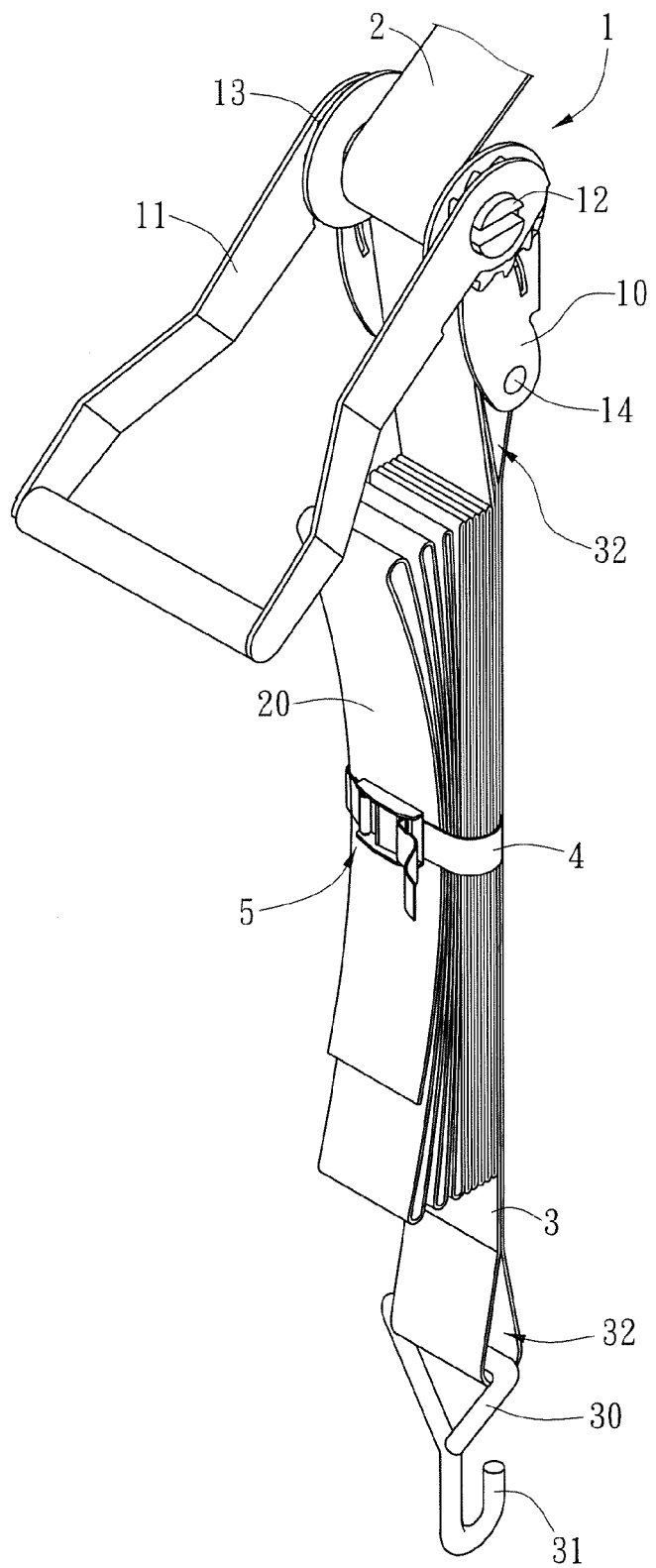
FIG. 6 is a schematic view showing that the extra band is collected within a short band according to the first embodiment.

As shown in FIG. 3, after the long band 2 of the hand puller is winded around the winding axle 12 and tightened, the extra band 20 outside the winding axle 12 can be collected and attached to the surface 33 of the short band 3 that is facing outside. As shown in FIGS. 4 and 5, the end of the belt 4 which is opposite to the end connected with the buckle 5 extends vertically away from the bottom portion of the buckle base 50 between the tugging part 511 and the stopping part 501. The positioning element 51 is urged by the torsional spring 513. Therefore, the tugging part 511 pinches and fixes the belt 4 toward the stopping part 501. In this case, one only needs to tighten the end of the belt 4 different from the one in connection with the buckle 5 in order to tighten and collect the extra band 20 on the short band 3, as shown in FIG. 6. To release the extra band 20 from the short band 3, one simply presses the pressing part 512. The pressing part 512 overcomes the urging force of the torsional spring 513 and presses downward. The tugging part 511 lifts up and removes the pressing on the belt 4. The user can then release the belt 4 from the buckle 5 and release the extra band 20.

From the above description, it is easy to find that a feature of the invention is in the tying structure of the short band 3. The structure for connecting the belt 4 and the hook tool is relatively simple in comparison with the conventional hand pullers. The disclosed hand puller has a lower cost. The operation of tightening the extra band 20 is also very simple for users.

Figure 7:
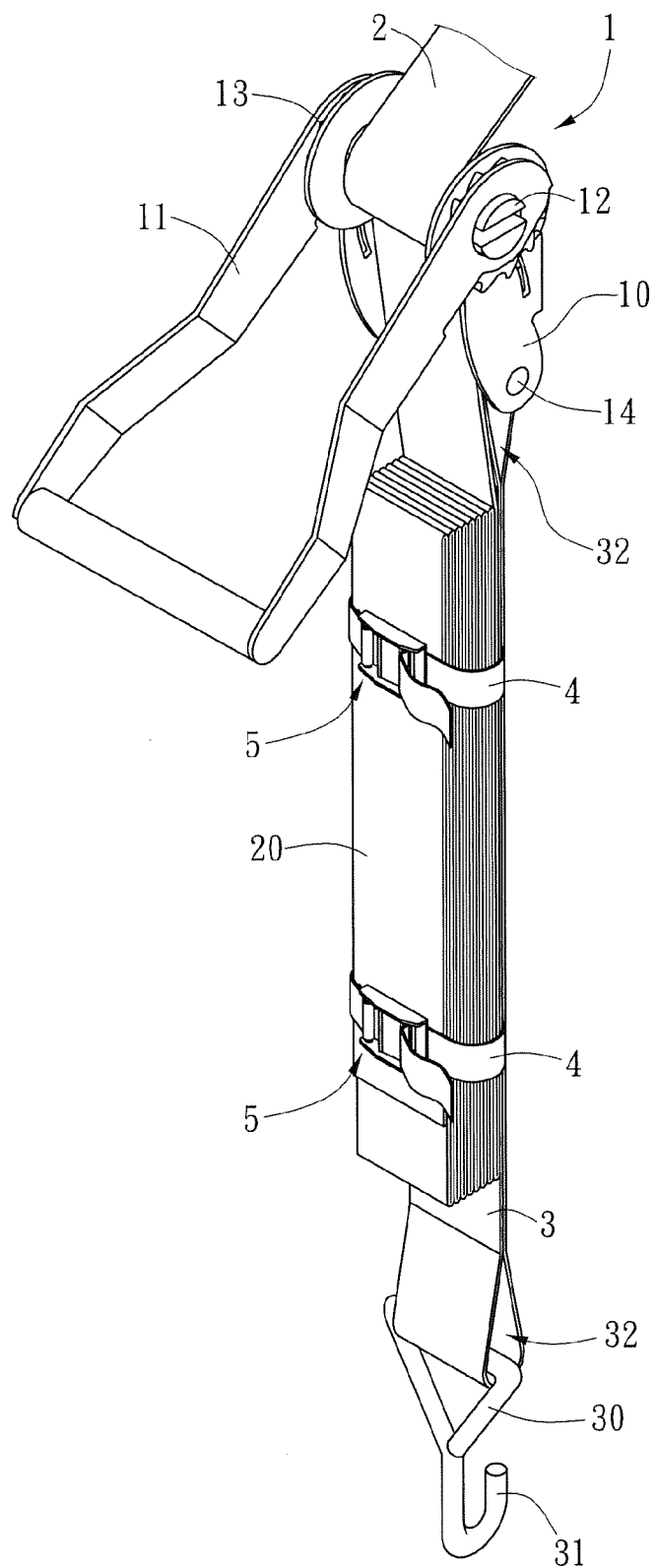
FIG. 7 is a schematic view showing that the extra band is collected within a short band according to the second embodiment of the invention.

Of course, the invention has many other embodiments that only vary in details. Please refer to FIG. 7 for a second embodiment of the invention. It differs from the first embodiment in that the short band 3 in this embodiment has two tying structures as in the first embodiment. One tying structure is the belt 4 fixed to the short band 3 near one of the through holes 32 by stitches. The other tying structure is the belt 4 fixed to the short band 3 near the other through hole 32 by stitches. When the two belts 4 are tightened and positioned by the buckle 5, the extra band 20 is attached to the belt surface 33 of the short band 3 at the two through holes 32. In this embodiment, the extra band 20 is attached better to the short band, achieving the same effect as the first embodiment.

Figure 8:
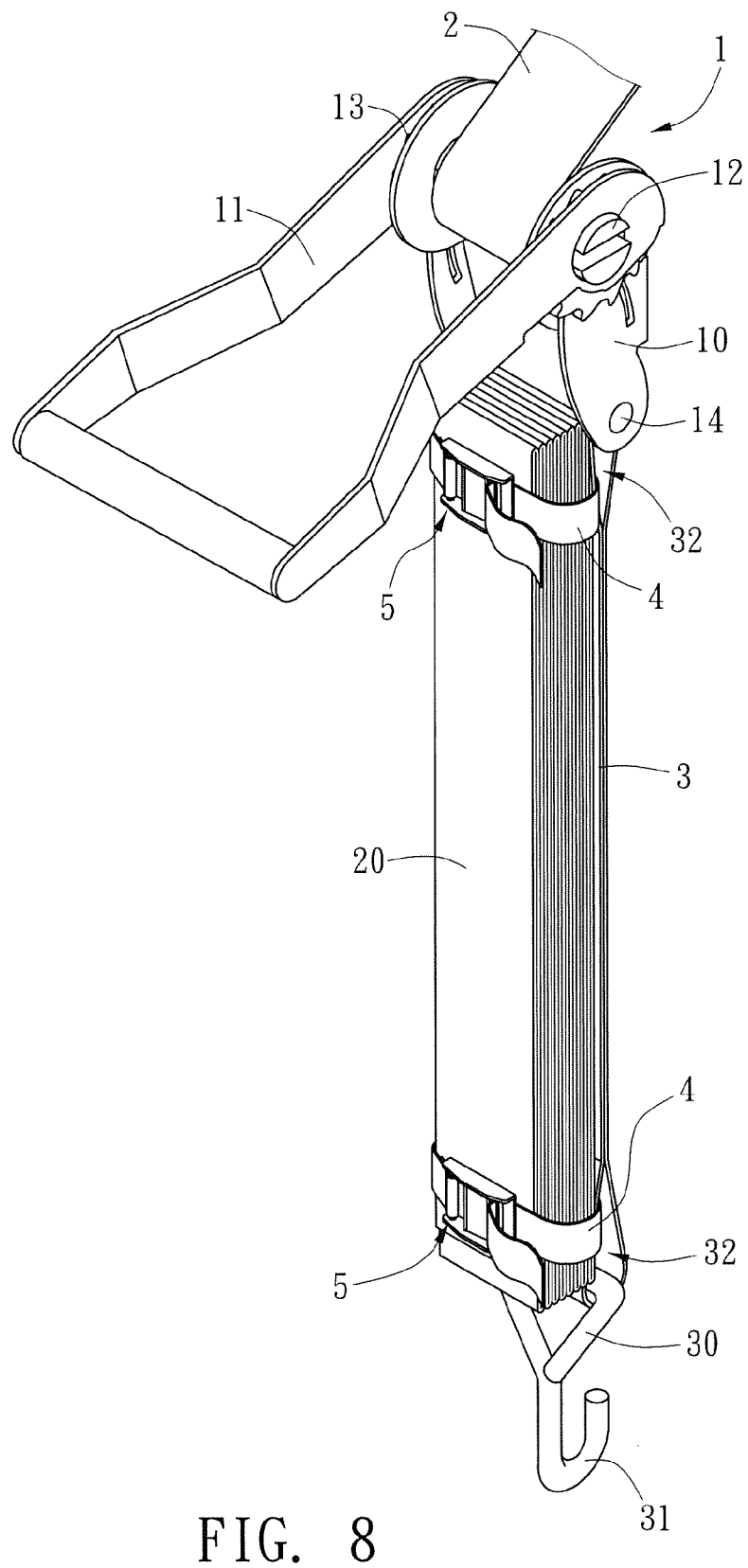
FIG. 8 is a schematic view showing that the extra band is collected within a short band according to the third embodiment of the invention.
Figure 9:
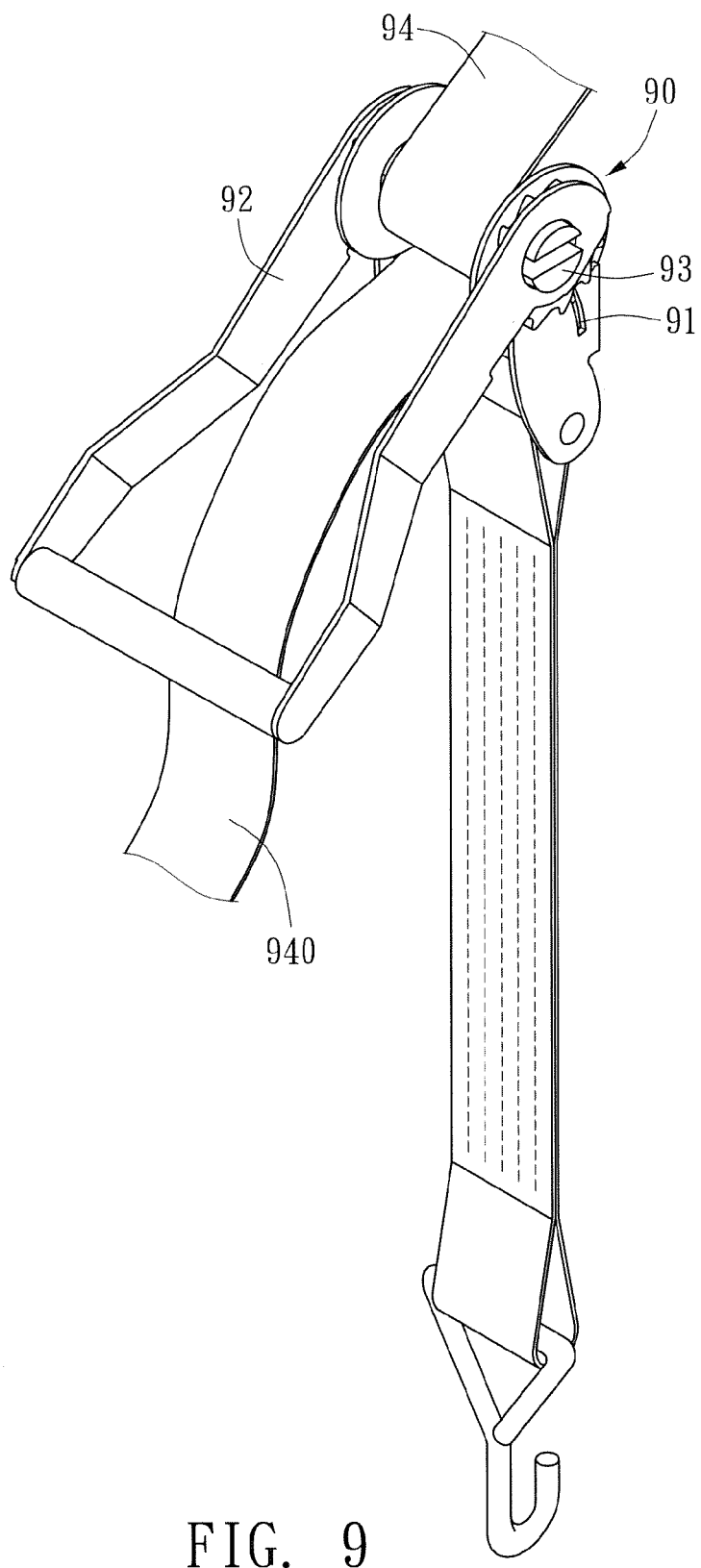
FIG. 9 is a schematic view of the usage of a conventional hand puller.

Please refer to FIG. 8 for a third embodiment of the invention. Its main difference from the first and second embodiments is also in the two tying structures on the short band 3. In this embodiment, the belt 4 of one of the tying structures movably goes through one through hole 32 of the short band 3. The belt 4 of the other tying structure movably goes through the other through hole 32 of the short band 3. When the two belts 4 are tightened and positioned by the buckle 5, the tightened extra band 20 is attached to the belt surface 33 of the short band 3 at the two through holes 32, as in the second embodiment. As in the second embodiment, the extra band 20 has better attachment with the short band than the first embodiment.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A hand puller for storing a band, comprising:
   a body, including at least a base provided with a winding axle at a first end of said at least base and having a ratchet operatively coupled to said winding axle and driven to rotate the winding axle;
   a long band, said long band being connected at a first end thereof to said winding axle of the body, said first end of said being winded around the winding axle by the rotation of the winding axle;
   a connecting band connected at a first end thereof to said at least base at a second end thereof opposite to said winding axle;
   a hook member, including a hook part connected to said connecting band at a second end thereof opposite to said first end of said connecting band; and
   at least one tying structure including:
   a belt secured to said connecting band, and at least one buckle,
   wherein a first end of the belt is secured to the buckle, and a second end of said belt is winded around said connecting band, extends through the buckle, and is secured in position by the buckle after adjusting the length of said belt,
   wherein said buckle includes:
   a buckle base having a bottom base portion, a air of base side walls extending at opposite sides of said bottom base portion, a stopping part extending vertically above said bottom base portion between said side base walls, and an axle element extending in proximity to said stopping part between said base side walls;
   a torsional spring mounted on said axle element and extending along the length of said axle element between and in contact with said base side walls; and
   a positioning element pivotally installed on said axle element,
   wherein said second end of said belt extends vertically away from said bottom base portion along said stopping part between said stopping part and said positioning element.

2. The hand puller of claim 1, wherein said positioning element is pivotally rotatable within the buckle base, wherein one end of the buckle base has an axle bar, and wherein said buckle base has another end opposite to said one end carrying the axle bar, said stopping part being located at said another end of said buckle base, the positioning element being pivotally installed between the axle bar and the stopping part of the buckle base, wherein the positioning element includes a tugging part and a pressing part, wherein said torsional spring has two end feet pressing against the bottom base portion of the buckle base and the pressing part, respectively wherein said first end of the belt is connected to the axle bar of the buckle base, wherein said second end of the belt extends between the tugging part of said positioning element and the stopping part, wherein the tugging part pinches and fixes the belt toward the stopping part, and wherein the tugging part departs from the belt after the pressing part of said positioning element is pressed.

3. The hand puller of claim 2, wherein an axle bar of the base of said body is positioned at the second end of the base of said body opposite to the winding axle, wherein the hook member includes a head section integrally formed with the hook part, said head section being connected to said connecting band of a fixed length at said second end of said connecting band opposite to said first end thereof, and wherein the belt of said at least one tying structure enters the connecting band at one side edge thereof and goes out from an opposite side edge thereof in the direction perpendicular to the direction of the correcting band.

4. The hand puller of claim 3, wherein each of said first and second ends of the connecting band has a through hole, wherein the axle bar of the body goes through one of the through holes, wherein the head section of said hook member extends through the other through hole, and wherein the belt extends through the connecting band between the to through holes and is attached to the connecting band by stitches.

5. The hand puller of claim 4, wherein the connecting band has said at least one tying structure whose belt is fixed to the center of the connecting band by stitches.

6. The hand puller of claim 4, wherein the connecting band has two of said tying structures, wherein the belt of one of the tying structures is fixed to the connecting band near one of the through holes, and the belt of the other tying structure is fixed to the connecting band near the other through hole.

7. The hand puller of claim 3, wherein each of said first and second ends of the connecting band has a through hole, wherein the axle bar of the body extends through one of the through holes, wherein said head section of said hook member extends through the other through hole, wherein connecting band has two of said tying structures, with the belt of one of the tying structures movably extending through one through hole of the connecting band, and with the belt of the other tying structure movably extending through the other through hole of the connecting band.

\* \* \* \* \*